US 9,916,260 B2

(12) United States Patent
Wang

(10) Patent No.: US 9,916,260 B2
(45) Date of Patent: *Mar. 13, 2018

(54) COMPUTER SYSTEM WITH MEMORY AGING FOR HIGH PERFORMANCE

(71) Applicant: Microsoft Technology Licensing, LLC, Redmond, WA (US)

(72) Inventor: Landy Wang, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/929,174

(22) Filed: Oct. 30, 2015

(65) Prior Publication Data

US 2016/0055098 A1 Feb. 25, 2016

Related U.S. Application Data

(63) Continuation of application No. 13/306,431, filed on Nov. 29, 2011, now Pat. No. 9,195,612.

(51) Int. Cl.
| G06F 12/00 | (2006.01) |
| G06F 12/123 | (2016.01) |
| G06F 12/12 | (2016.01) |
| G06F 12/02 | (2006.01) |
| G06F 12/06 | (2006.01) |
| G06F 12/1009 | (2016.01) |
| G06F 3/06 | (2006.01) |

(52) U.S. Cl.
CPC ........ *G06F 12/123* (2013.01); *G06F 12/0246* (2013.01); *G06F 12/0638* (2013.01); *G06F 12/1009* (2013.01); *G06F 12/12* (2013.01); *G06F 3/06* (2013.01); *G06F 2212/202* (2013.01); *G06F 2212/2028* (2013.01); *G06F 2212/65* (2013.01); *G06F 2212/7201* (2013.01); *G06F 2212/7211* (2013.01)

(58) Field of Classification Search
CPC .................................. G06F 12/12; G06F 3/06
See application file for complete search history.

(56) References Cited

U.S. PATENT DOCUMENTS

| 6,401,181 B1 | 6/2002 | Franaszek et al. |
| 6,496,912 B1 | 12/2002 | Fields et al. |
| 7,653,799 B2 | 1/2010 | Hepkin et al. |
| 7,752,417 B2 | 7/2010 | Manczak et al. |

(Continued)

OTHER PUBLICATIONS

"Estimating Temporary Space Requirements", Retrieved on: Sep. 12, 2011, 11 pages.

(Continued)

*Primary Examiner* — Charles Rones
*Assistant Examiner* — Tian-Pong Chang
(74) *Attorney, Agent, or Firm* — Davin Chin; Chin IP, PLLC

(57) ABSTRACT

A memory manager in a computer system that ages memory for high performance. The efficiency of operation of the computer system can be improved by dynamically setting an aging schedule based on a predicted time for trimming pages from a working set. An aging schedule that generates aging information that better discriminates among pages in a working set based on activity level enables selection of pages to trim that are less likely to be accessed following trimming. As a result of being able to identify and trim less active pages, inefficiencies arising from restoring trimmed pages to the working set are avoided.

20 Claims, 7 Drawing Sheets

(56) References Cited

U.S. PATENT DOCUMENTS

| | | |
|---|---|---|
| 2004/0205297 A1 | 10/2004 | Bearden |
| 2007/0204117 A1 | 8/2007 | Van Riel et al. |
| 2007/0245110 A1 | 10/2007 | Shibayama et al. |
| 2008/0222111 A1 | 9/2008 | Hoang et al. |
| 2009/0228675 A1 | 9/2009 | Riel et al. |
| 2009/0276601 A1 | 11/2009 | Kancherla |
| 2011/0246723 A1 | 10/2011 | Van Der Wolf et al. |

OTHER PUBLICATIONS

Chengjun, Wang, "The Research on the Dynamic Paging Algorithm Based on Working Set", In Proceedings of Second International Conference on Future Information Technology and Management Engineering, Dec. 13-14, 2009, pp. 396-399.

Zhou, et al., "Dynamic Tracking of Page Miss Ratio Curve for Memory Management", In Proceedings of the 11th International Conference on Architectural Support for Programming Languages and Operating Systems, Oct. 7-13, 2004, pp. 177-188.

"Final Office Action Issued in U.S. Appl. No. 13/306,431", dated Nov. 7, 2013, 24 Pages.

"Final Office Action Issued in U.S. Appl. No. 13/306,431", dated Jun. 1, 2015, 8 Pages.

"Non-Final Office Action Issued in U.S. Appl. No. 13/306,431", dated Apr. 24, 2013, 23 Pages.

"Non-Final Office Action Issued in U.S. Appl. No. 13/306,431", dated May 23, 2014, 25 Pages.

"Non-Final Office Action Issued in U.S. Appl. No. 13/306,431", dated Nov. 28, 2014, 6 Pages.

"Notice of Allowance Issued in U.S. Appl. No. 13/306,431", dated Jul. 28, 2015, 13 Pages.

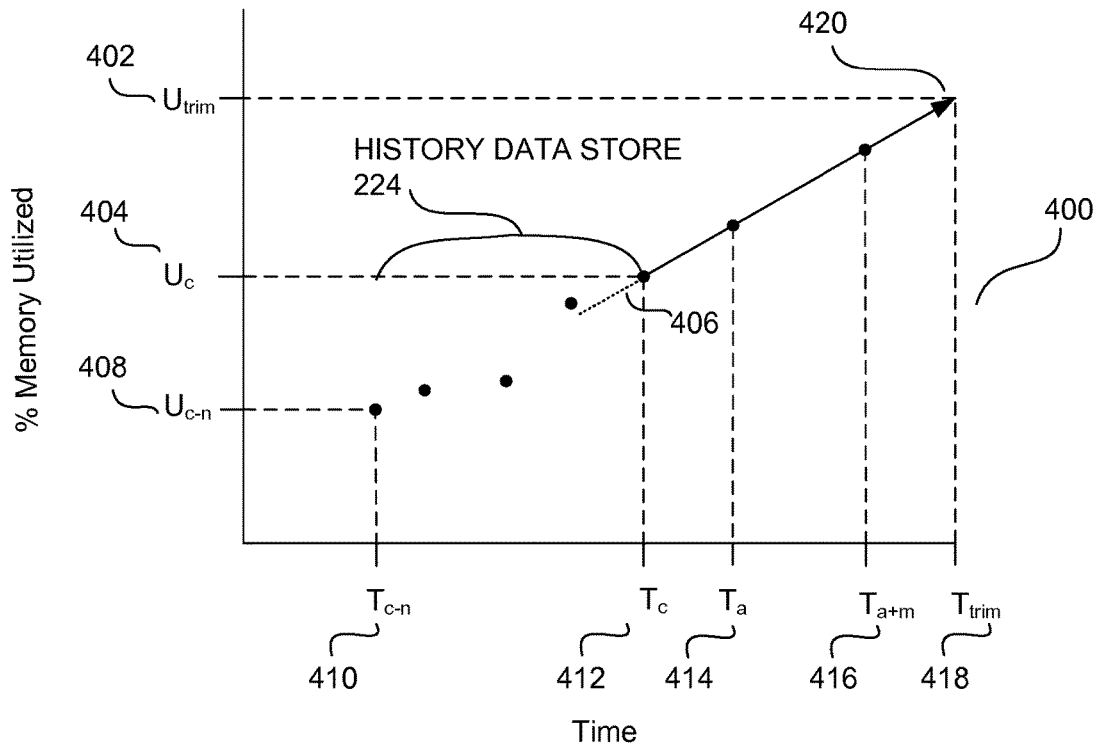
FIG. 4A
HISTORY DATA STORE
224
| Time of Computation | % Memory Utilized |
|---|---|
| $T_c$ | $U_c$ |
| $T_{c-1}$ | $U_{c-1}$ |
| $T_{c-2}$ | $U_{c-2}$ |
| $T_{c-3}$ | $U_{c-3}$ |
| $T_{c-4}$ | $U_{c-4}$ |
| $T_{c-n}$ | $U_{c-n}$ |
FIG. 4B
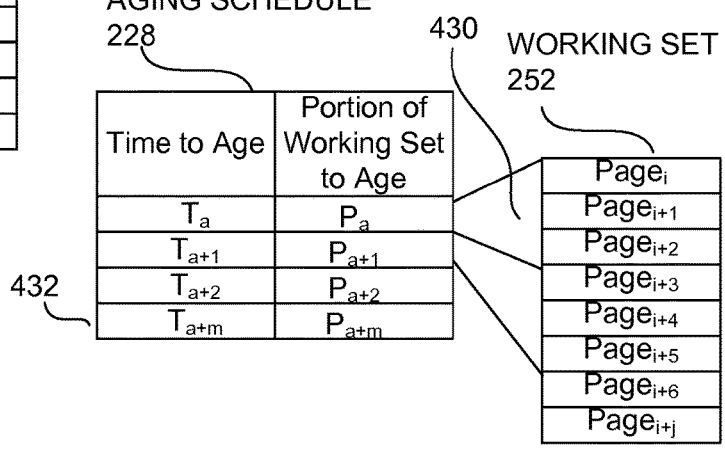
FIG. 4C

COMPUTER SYSTEM WITH MEMORY AGING FOR HIGH PERFORMANCE

CROSS-REFERENCE TO RELATED APPLICATION(S)

This application is a continuation of U.S. patent application Ser. No. 13/306,431, filed Nov. 29, 2011, entitled "COMPUTER SYSTEM WITH MEMORY AGING FOR HIGH PERFORMANCE". The entirety of this afore-mentioned application is incorporated herein by reference.

BACKGROUND

Modern computer systems require a large amount of random access memory (RAM) to run software programs. Processes that each execute software, such as the operating system and various application programs, constantly interact with data stored in RAM. Each process is assigned "pages" of RAM to use. The pages are units of memory whose size depends on the host computer system.

As computers became more sophisticated and complex, processes required more memory than is physically available in RAM. Virtual addresses for memory overcome this problem by allowing processes to share physical RAM. Such sharing is achieved by extending the memory address space to create a virtual address space. Virtual addresses allow the memory to appear as though there is a large amount of memory.

This memory is regarded as "virtual" memory because, at any given time, some of the pages allocated to processes do not exist in RAM. Rather, a memory manager performs what are called paging operations in which the contents of some pages are stored in slower, non-volatile memory when not actively in use and are brought into the faster RAM when they are to be accessed.

The memory manager operates to provide pages associated with a virtual address in physical RAM when those pages are needed. The set of pages in the virtual address space that currently reside in RAM is known as the "working set." When contents of a particular virtual page is needed, but that page is not stored in the RAM, the memory manager may retrieve that data from non-volatile memory and make it available in the RAM. Conversely, when a process requires more memory than is free in the RAM, the memory manager may "trim" pages from the working set by removing the contents of one or more pages in RAM and ensuring that the contents is stored in the non-volatile storage. Trimming pages frees up space in the RAM for other pages to be brought into RAM.

To perform paging operations, page tables are used to store a mapping between virtual and physical addresses. In addition to the mapping, page table entries (PTEs) often include a page offset, and information which details use of the page. This information may be in the form of an access bit, which indicates whether the page has been accessed during an interval since the access bit was reset. In addition to an access bit, an age count provides information that details the use of the page. The age count is often stored in a working set list entry (WSLE), and indicates the number of successive intervals during which the page was not accessed. This information is used by the memory manager to determine which pages to trim when the amount of available RAM becomes so limited that the most frequently accessed pages are kept in RAM and the less frequently accessed pages are paged out to make more RAM available. The age count is set by the memory manager through an operation called "aging." Aging tracks access history of pages in a working set by periodically checking whether each page has been accessed during an interval since access to the page was last checked. Such a check may be performed by periodically checking whether the access bit for the page is set. If so, the page has been accessed and the age count for the page is reset. The access bit is also reset. If not, the age count for the page may be increased, up to some maximum count established by the number of bits in the WSLE (or PTE) allocated for holding the age count. The age count allows the memory manager to select pages that can be trimmed with low likelihood that performance of the computer system will be impacted by removing from the working set a page that is actively being used.

Because aging information is used when pages need to be trimmed from the working set, a computer system may perform aging only when the working set occupies more than some threshold amount of the RAM, thus avoiding the CPU and memory costs of conducting an aging scan.

SUMMARY

In a computing system, an aging schedule for memory pages in a working set is set based on a predicted time for trimming pages from the working set. The aging schedule may be set such that, at the predicted time for trimming pages, age counts for the pages will discriminate among pages based on a degree of activity for the pages. Selection of pages to trim based on these age counts, thus, may lead to more efficient computer operation.

In some embodiments, the aging schedule is set by specifying times at which aging passes occur. Alternatively or additionally, the schedule may define a portion of the pages to age at each aging pass. Such an approach may allow aging to occur over a relatively long interval preceding the trimming. However, by inappropriate selection of the aging interval and size of the portion, the number of pages that have reached the maximum age count at the time of trimming is limited.

According to a first aspect, a method is disclosed for aging memory pages of a working set. The method may include computing a projected time when trimming of the memory will occur. Based on the projected time, an aging schedule may be set.

In another aspect, a computer system may be adapted to age portions of memory pages of a working set according to an aging schedule. The computer system may include a volatile memory comprising a plurality of pages, a non-volatile memory comprising a page file, and a memory manager that schedules the aging of the pages of the working set. The memory manager may include a history data store which includes stored memory utilization values. The memory manager may also include an aging scheduler which computes a projected time when trimming of the volatile memory will occur. The aging scheduler can set at least one of a plurality of times and associated amounts of the working set to age before or at the projected time. An aging component of the memory manager ages the working set. The memory manager may also include a page table with entries that include age information. The age information may be used to determine page age. A trimming component may then be included in the memory manager to trim the working set.

According to another aspect, at least one computer-readable storage medium may comprise computer-executable instructions that, when executed by at least one processor of a computing device having memory, perform a method of dynamically computing an aging schedule for a memory. The method may be based on sensed memory usage information.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4A is an example of memory utilization over time;

FIG. 4B is an example of stored memory utilization history;

FIG. 4C is an example of an aging schedule and the set of pages in a working set that are aged;

DETAILED DESCRIPTION

Figure 1:
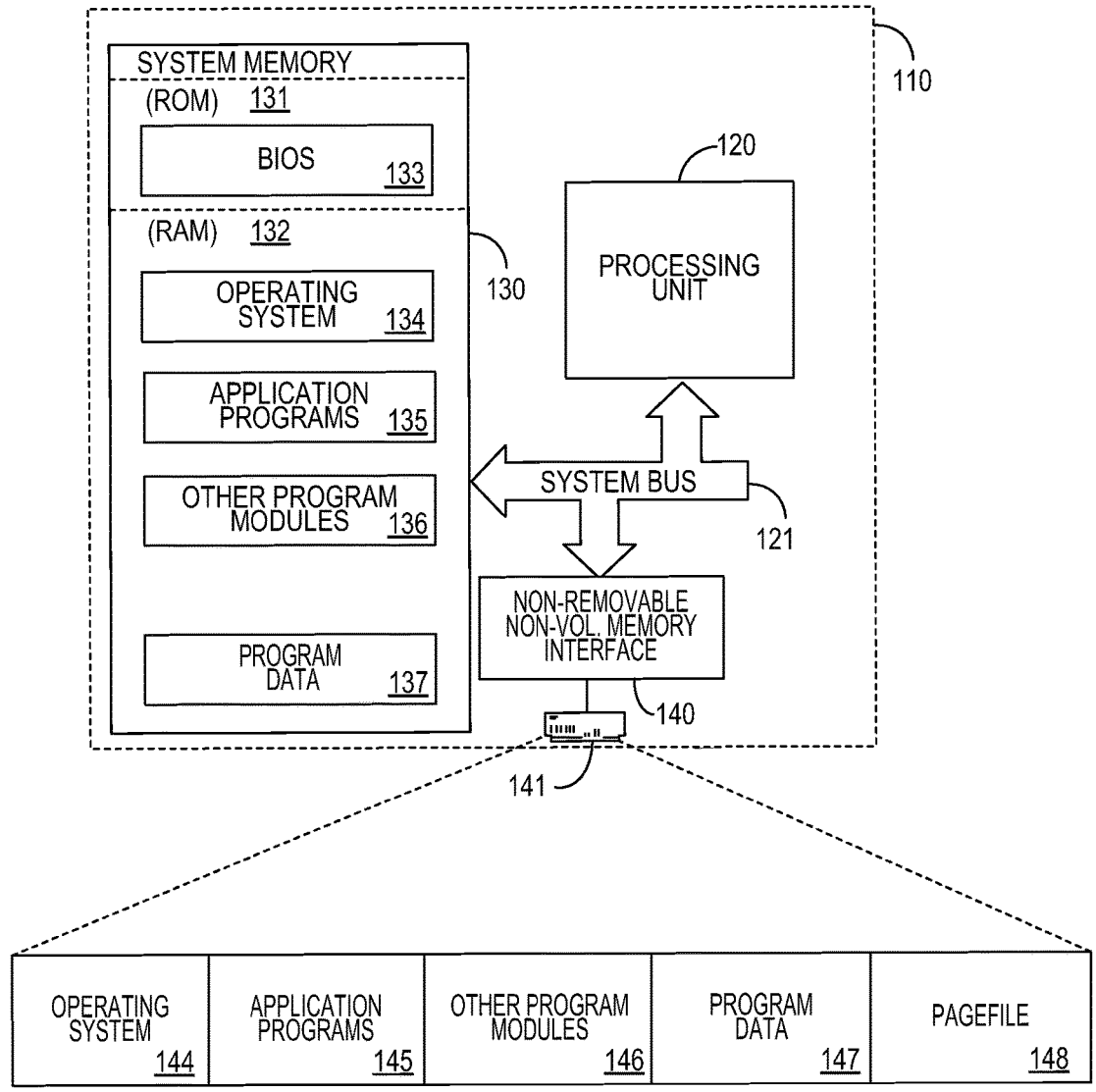
FIG. 1 is a block diagram of an exemplary computing environment in which embodiments of the invention may operate.

The inventors have recognized and appreciated that the efficiency of operation of a computer system can be improved by setting an aging schedule based on a predicted time for trimming pages from a working set. An aging schedule that generates aging information that discriminates among pages in a working set based on activity level enables selection of pages to trim that are less likely to be accessed following trimming. As a result of selecting and trimming less active pages, inefficiencies arising from restoring trimmed pages to the working set is avoided.

In some embodiments, a desired quality of aging information is achieved by dynamically establishing an aging schedule. The aging schedule may be established such that, when the aging information is likely to be accessed for trimming, a range of aging counts will be distributed across the pages in the working set. Such a distribution of aging counts may be achieved by dynamically selecting a rate of aging of pages, at least in part, in relation to the rate at which free pages in RAM are being consumed. Factors such as the remaining amount of free memory in the RAM and the maximum supported aging count may also be used in setting the aging schedule.

The inventors have also recognized and appreciated that the quality of aging information may also be increased by collecting aging information over a suitably long period of time. However, aging is computationally intensive and excessive aging can tend to decrease the performance of the computing system. In conventional aging approaches in which aging is performed only when memory utilization approaches a threshold, the aging time span will be too short to provide useful differentiation between the ages of all the scanned pages. Conversely, if excessive aging is performed then too many pages will be marked as the oldest possible age, resulting in a lack of useful differentiation between ages of pages. The aging information can be skewed towards recent activity, and not reflective of which pages will be accessed going forward. In accordance with some embodiments, aging information is more representative of long term memory usage patterns and of a better quality for discriminating among pages to select pages for trimming.

In some embodiments, this quality is achieved by establishing an aging schedule such that the rate at which aging is performed on each page is based on the time until the aging information is projected to be used in trimming pages. The rate of aging may be specified in the aging schedule by specifying a time between aging passes and/or selecting a portion of the pages in the working set that are aged at each aging pass. In some embodiments, the rate of aging each page is selected by computing a time until trimming will occur and computing a rate of aging such that each page will be aged a selected number of times at that time. That selected number of times may be based on the maximum aging count—for example, it may be one half the maximum aging count.

Turning now to FIG. 1, an exemplary system is shown in which dynamic aging as described herein may be implemented. FIG. 1 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that they may be different copies. A user may enter commands and information into the computer 110 through input devices such as a keyboard and pointing device (not shown), such as a mouse, trackball or touch pad. Other input devices (not shown) may include a microphone, joystick, game pad, satellite dish, scanner, or the like.

Figure 2:
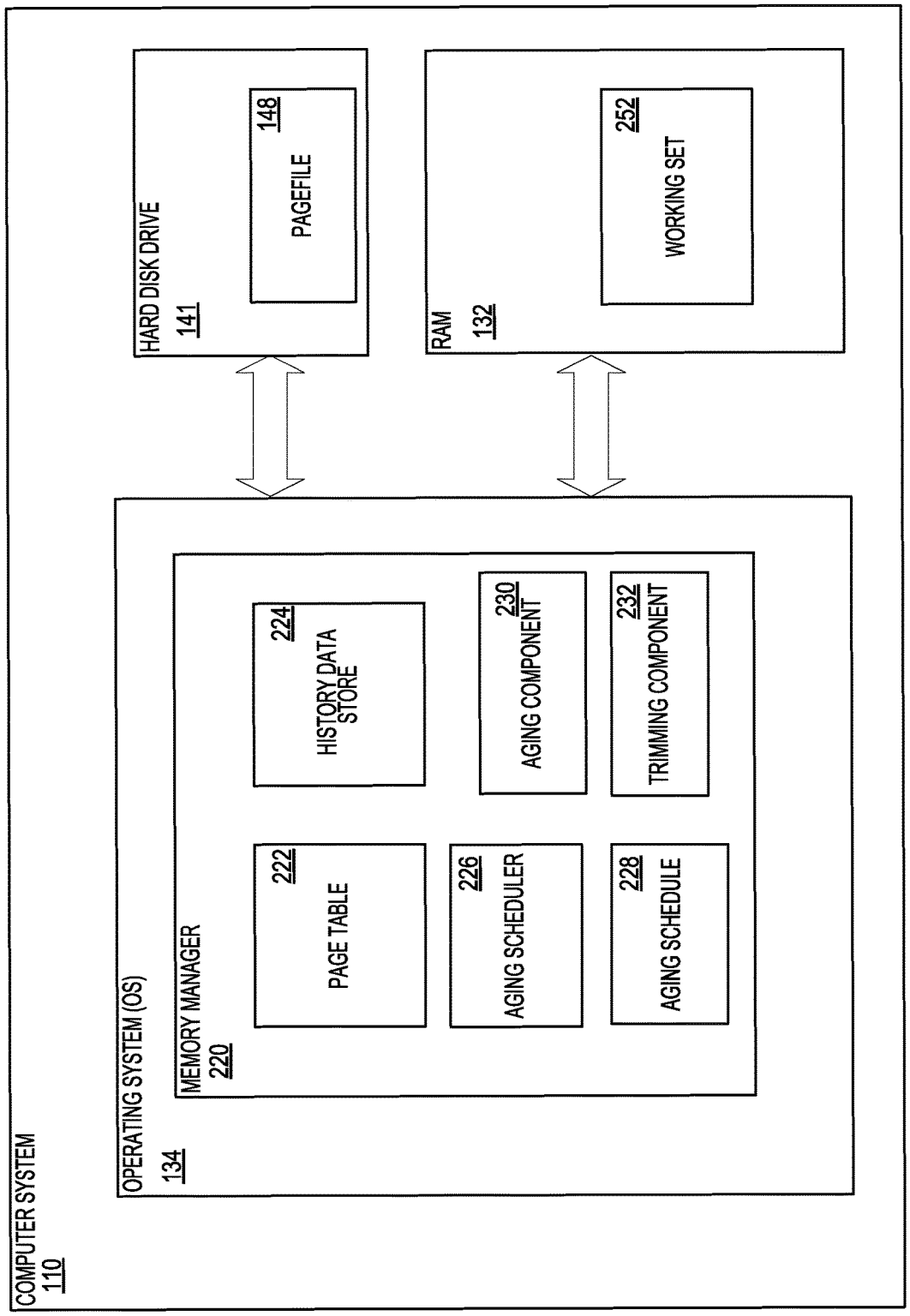
FIG. 2 is a block diagram showing exemplary hardware and software components of a computing system of some embodiments of the present invention.

FIG. 2 illustrates example components of computer system 110 that may be used in some embodiments of a computer system that implements memory aging for high performance. Both software and hardware components are shown and, where possible, hardware components that were shown in FIG. 1 are represented by a like numeral. Also, for clarity, FIG. 2 shows software that is stored on hardware resources, such as RAM 132, as a separate item from the hardware even though FIG. 1 shows, for example, operating system 134 as being stored on RAM 132. A person of ordinary skill in the art would understand that the software is stored in memory components and that FIG. 2 is drawn to clearly elucidate the details of some embodiments.

FIG. 2 illustrates the computer system 110 comprising an operating system 134 including a memory manager 220, a hard disk drive 141 and RAM 132. As noted above, the invention is not limited to these specific components, but they are chosen to illustrate but one embodiment of the invention.

RAM 132, as described in view of FIG. 1, is a memory that generally holds data for processes that are presently executing on processing unit 120. As is known for conventional computer systems, RAM may be divided into units of memory called "pages". A page may be a unit of memory with a predetermined number of bytes. A typical page is 4 KB, but pages are not so limited and may be any size.

Hard disk drive 141 stores pagefile 148, which may be used to store non-volatile copies of pages of data and extend the memory capabilities of computer system 110 by supporting virtual memory as is known in the art. One of ordinary skill in the art would understand that hard disk drive 141 is not limited to a single pagefile 148. It is indeed contemplated that a plurality of pagefiles may be used by memory manager 220. Only a single pagefile 148 is shown for the sake of clarity. Furthermore, computer system 110 is not limited to a single hard disk 141. Computer system 110 may comprise a plurality of hard disk drives, or other non-volatile storage devices, each with one or more pagefiles stored thereon. An external memory device that is not part of the computer system 110 may also store a pagefile.

Operating system 134 comprises memory manager 220. There are typically hundreds of other components of operating system 134, but they are not illustrated for the sake of clarity. Memory manager 220 may handle interactions between operating system 134 and the memory devices as is known for conventional computer systems. The operations of memory manager 220 include allocation of memory to processes running on the processing unit 120. Memory manager 220 hides the details of RAM 132 and the physical pages therein from the processes that use RAM 132 by implementing a virtual memory system. Virtual memory allows software running on computer system 110 to refer to a virtualized memory address, masking the details of how to manage RAM 132.

Memory manager 220 receives requests related to memory, identified by virtual memory address, from software processes or other software components, and translates the requests into actions in order to implement control of physical hardware. For example, memory manager 210 controls read and write commands to RAM 132 and controls the flow of data between software processes and RAM 132. The memory manager 220 also handles requests from multiple processes and determines how to allocate memory resources among all processes on computer system 110.

Virtual memory is allocated to processes by memory manager 220. To translate between virtual memory and physical memory, memory manager 220 may maintain a map between virtual memory addresses and physical memory addresses. To map a page in virtual memory space to a page in RAM 132, memory manager 220 may create and access page table 222, also using techniques as are known in the art. Details of some embodiments of page table 222 will be discussed in relation to FIG. 3.

The memory manager 220 may allocate to processes a greater number of virtual memory pages than the number of pages that physically exist in RAM 132. The set of pages in the virtual address space, which currently reside in RAM 132, defines a working set 252. One of ordinary skill in the art would understand that RAM 132 is not limited to a single working set. It is indeed contemplated that a plurality of working sets may reside in RAM 132. Only a single working set 252 is shown in FIG. 2 for the sake of clarity.

To retain data for virtual memory for which there is not corresponding physical RAM, memory manager 220 maintains pagefile 148, which may be any organized collection of information stored on any suitable type of memory. Pagefile 148 may be a file maintained in non-volatile memory by the file management system of the OS of the computer system, but is not necessarily so. Any suitable portion of memory organized in a suitable way may act as a pagefile. Any suitable storage medium may be used to store the pagefile. In one embodiment shown in FIG. 2, the storage medium is a hard disk.

Pagefile 148 may store pages of data like those in RAM 132. However, because hard disk drive 141 may be able to store more data than RAM 132, pagefile 148 may hold data that is not currently in RAM 132. When the contents of a particular virtual page is needed, but that page is not stored in RAM 132, memory manager 220 may retrieve the page from pagefile 148 and make it available in RAM 132, where a process can access the page more efficiently than from pagefile 148.

When a process requires more memory than is free in RAM 132, memory manager 220 may "trim" pages from working set 252 by removing the contents of one or more pages in RAM 132 and ensuring that the contents is stored in pagefile 148, using techniques as are known in the art. A trimming component 232 of memory manager 220 may perform "trimming." Trimming pages from working set 252 frees up space in RAM 132 for other pages to be allocated for use by a process or brought from pagefile 148 into RAM 132.

Details of some embodiments of trimming component 232 will be discussed in relation to FIG. 7. However, in the illustrated embodiment, trimming may be performed by selecting pages to trim based on the activity of those pages.

Pages that have been least active may be selected for trimming. This selection approach is premised on pages that have been inactive being less likely to be accessed going forward.

Trimming pages that are likely to be accessed going forward may result in significant performance loss. Significant performance loss of the computer system may result due to page swapping back and forth between RAM and non-volatile RAM. Excessive page swapping between RAM and non-volatile RAM may slow down the computer system. Such a condition is known as thrashing. Thrashing may be avoided if the trimming operation selects to trim a set of inactive pages which are less likely to be accessed going forward.

In some embodiments, the efficiency of operation of a computer system can be improved by generating aging information that better discriminates among pages in a working set based on activity level. The inventors have recognized and appreciated that, in some conventional techniques, aging may be initiated too close to the time when trimming occurs to generate high quality aging information. It is possible that none of the pages will be aged a sufficient number of times for there to be a significant spread in age counts. Also, the age counts may not represent accesses to the pages over a sufficiently long interval to be representative of long term access patterns, such that they will not be useful in identifying pages likely to be accessed again. Conversely, if aging is initiated too long before trimming is performed, many pages will have high aging counts, making it difficult to discriminate among the pages that are least active and those that are inactive, but to a lesser degree.

However, when memory manager 220 includes an aging scheduler 226 that generates an aging schedule 228 according to techniques as described herein, aging information that discriminates among pages in a working set based on activity level enables trimming component 232 to select pages to trim that are least likely to be accessed following trimming. And avoids the CPU/memory cost of needless aging as well.

Memory manager 220 includes an exemplary aging component 230, an exemplary aging scheduler 226, and an exemplary aging schedule 228. In some embodiments, 230, 226 and 228 may yield a better quality aging information that results in a distribution of aging counts that allows good discrimination amongst pages based on activity level. As a result, trimming component 232 may select and trim less active pages, avoiding inefficiencies arising from restoring trimmed pages to working set 252.

Memory manager 220 controls "aging" by using aging component 230. Aging tracks access history of pages in working set 252 by periodically checking whether each page has been accessed during an aging interval. In some embodiments, the aging interval and the periodic access check interval may be the same, with aging occurring in multiple passes and access since the last pass being checked, but it is not a requirement that these intervals be the same. Details of some embodiments of aging component 230 will be discussed in relation to FIG. 6.

Memory manager 220 may include aging scheduler 226 to set aging schedule 228 indicating when each page in working set 252 is aged. Aging schedule 228 may be set by specifying times at which aging passes occur. Alternatively or additionally, aging schedule 228 may define a portion of pages to age at each aging pass. Details of some embodiments of aging schedule 228 and aging scheduler 226 will be discussed in relation to FIG. 4C and FIG. 5.

In some embodiments aging scheduler 226 may set aging schedule 228 based on a predicted time when trimming component 232 will trim pages from working set 252. Memory manager 220 may maintain history data store 224 to store RAM 132 usage information, which may be used to predict the time when trimming will be performed. Details of some embodiments related to the predicted time for trimming and the history data store 224 will be discussed in relation to FIG. 4A and FIG. 4B.

Figure 3:
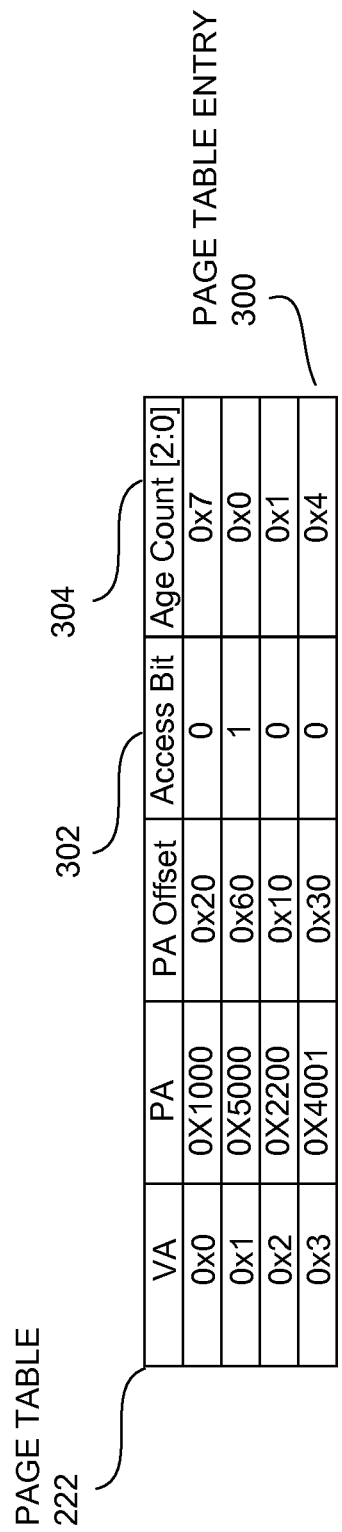
FIG. 3 is a simplified diagram of a page table and a page table entry.

Turning now to FIG. 3, an illustration of a simplified diagram of a page table 222 data structure and a page table entry 300 are shown. One of ordinary skill in the art would recognize that there are many ways to implement a page table. The specific implementation of the page table is not critical to the invention. For clarity, entries corresponding to only four virtual memory pages are shown in FIG.3, but one of ordinary skill in the art would understand that the data structure may be extended to thousands or millions of entries depending on the number of virtual pages in use in a computer system. In addition, only five fields of the data structure are shown for the sake of clarity. One of ordinary skill in the art would understand that other fields may be needed and that selected fields relevant for discussion of the present invention or its operating environment are shown.

The portion of page table 222 illustrated in FIG. 3 focuses on how page table entries store information that details page activity level. Each row of table 222 is a page table entry. The page table entries include a virtual address that maps to a physical address and offset of a page located in RAM 132. An access bit 302 may indicate whether the page has been accessed during an interval since it was last reset. An age count 304 may indicate the number of successive intervals during which the page was not accessed.

As a specific example, in some embodiments, aging component 230 may perform a check of an access bit set by hardware for page table entry 300 to check if the page addressed by virtual address 0×3 has been accessed during an interval since access to the page was last checked. If the access bit is set, then the page has been accessed and aging component 230 may reset age count 304 for the page, store the access bit as 302, and reset the access bit in the hardware.

If the access bit is not set, then the aging component may store the access bit as 302 and then may increase the age count 304 for the page. The age count may be increased, up to some maximum count established by the number of bits for age count 304 in page table entry 300.

Access bit 302 and age count 304 are but one form of representing information that details page usage. One of ordinary skill in the art would realize that other forms may be used to represent such page age information. For example, in FIG. 3, the access bit is shown as a single bit and the age count is shown as three bits. Such information could be extended to any number of bits and need not necessarily be located in the page table entry 300. Also, the age information need not necessarily be fields of the same data structure. Multiple data structures may contain page information. Age information such as an access bit and age count may be stored in fields of separate data structures that may have entries corresponding to a same page.

FIG.3 illustrates aging information that can be used to discriminate among pages in order to select pages for trimming. When pages are selected for trimming, the least active pages may be selected. Aging schedule 228 may be established such that, when aging information is likely to be accessed for trimming, a range of aging counts 304 will be distributed across the pages in working set 252 such that the least active pages can be reliably selected.

Factors such as the usage rate of RAM 132 may be used in setting aging schedule 228. FIG. 4A illustrates an example of memory utilization over time by way of graph 400. A history data store 224 may include memory utilization values calculated and stored with an associated time. Such memory utilization values may be calculated as a percentage of "free" pages in RAM 132 and may be determined using techniques known in the art. However, the utilization values may be calculated in any other suitable way.

According to some embodiments, the memory utilization values stored in history data store 224 may be used to compute a projected time when trimming of working set 252 may be triggered. FIG. 4B shows an example of memory utilization values stored in history data store 224 over a time duration between $T_{c-n}$ 410 and $T_c$ 412 shown on graph 400 in FIG. 4A. For example, FIG. 4A shows a percent of memory utilization $U_{c-n}$ 408 at a time $T_{c-n}$ 410 and $U_c$ 404 at a time $T_c$ 412.

The time $T_c$ 412 may reflect when a projected trimming time of $T_{trim}$ 418 is computed. The projected trimming time may be computed based on a computed rate of memory consumption $R_c$ 406, which is computed based on the rate of change of memory utilization over a previous time window, such as during the time between $T_{c-n}$ 410 and $T_c$ 412.

One of ordinary skill in the art would understand that that the computed rate $R_c$ 406 may be calculated as an average change between successive measurements of the memory utilization values in history data store 224 over the time window. As an example, the rate of change determined at each aging pass $T_c$ as $R_c=(U_c-U_{c-1})/\Delta T$, where $\Delta T$ is that time between aging intervals. The values of $R_c$ computed for times in the window could then be summed and divided by the number of aging passes in the window.

However, the rate may be calculated in any number of ways, such as a running average, and the calculation is not limited to an average calculation nor is it limited by the duration of the time window used to collect the memory utilization values, or the number of memory utilization values used in the calculation. As an example of one alternative, the rate may be calculated by a known mathematical technique that fits a curve to a data set or otherwise extracts a trend from the data set.

Regardless of how the rate of memory consumption is computed, according to some embodiments, the projected time $T_{trim}$ 418 computed at time $T_c$ 412 may be based on the current memory utilization value $U_c$ 404 and the computed rate $R_c$ 406. Line 420 shows an extrapolation of memory usage between the computation time $T_c$ 412 and the project trimming time $T_{trim}$ 418. Line 420 is shown as linear, but the extrapolation is not limited to be linear. The projected $T_{trim}$ 418 memory utilization value $U_{trim}$ 402 may reflect when the working set 252 is projected to occupy more than some threshold utilization of the RAM 132 that triggers trimming.

Having thus described an exemplary computation of a projected time when trimming of working set 252 will occur, FIG. 4C will now be described. FIG. 4C illustrates an example of an aging schedule 228. An aging schedule 228 may generate aging information such that, at the time $T_{trim}$ 418 when trimming is projected to occur, a trimming component 232 will have available aging information to better discriminate among pages in working set 252 in order to select less active pages to be trimmed.

In FIG. 4C, aging schedule 228 shows times at which aging passes are to occur. In addition, for each pass, a portion of working set 252 to be aged is also specified. According to some embodiments, all pages are aged at each aging pass such that a number of times to age each page during the time between $T_c$ 412 and $T_{trim}$ 418 is the number of aging passes. Though, in other embodiments, only a portion of the pages in the working set are aged at each aging pass. Accordingly, FIG. 4C illustrates a plurality of scheduled times to age and portions to age at the associated times.

Graph 400 (FIG. 4A) shows scheduled times $T_a$ 414 and $T_{a+m}$ 416 which are illustrated in the aging schedule of FIG. 4C. The plurality of times to age is scheduled to occur at times before or at the projected time of trimming $T_{trim}$ 418. It should be appreciated that FIG. 4C is a schematic representation of an aging schedule, and a schedule may be defined in any suitable way. For example, aging schedule 228 may specify a time between aging passes and/or may list or otherwise identify the portion of the pages of working set 252 that are aged at each aging pass. Though, in some embodiments, the aging schedule may specify a percentage of the pages in the working set to be aged in each aging pass and aging component 230 (FIG. 2) may select successive groups of pages of the indicated size. Accordingly, it should be appreciated that the specific technique used to select a portion of the pages to be aged at each aging pass is not critical to the invention.

Nonetheless, in this example, FIG. 4C illustrates specified times for when to age and what portion to age at the associated time. For example, pass 432 is shown to age at time $T_{a+m}$ a portion $P_a$ of working set 252. According to some embodiments, the portion $P_a$ corresponds to a different set of pages 430 at each pass. FIG. 4C illustrates an example of the set of pages in a working set 252 which are aged at passes corresponding to times $T_a$ and $T_{a+1}$.

According to some embodiments, aging schedule 228 is set by aging scheduler 226. Aging scheduler 226 may schedule aging during the entire time the computing device is in operation. However, in some embodiments, the aging scheduler 226 may set a schedule at a predetermined time after a computer begins to operate or based on an event which is detected (e.g., memory utilization exceeds a threshold or more memory is allocated, or when the projected time until trimming is less than or equal to some threshold time), or any other suitable way. Though, if the aging is initiated when the utilization exceeds a threshold, the threshold may be set lower than in some conventional aging policies so that aging information may be collected over a longer period of time.

Figure 5:
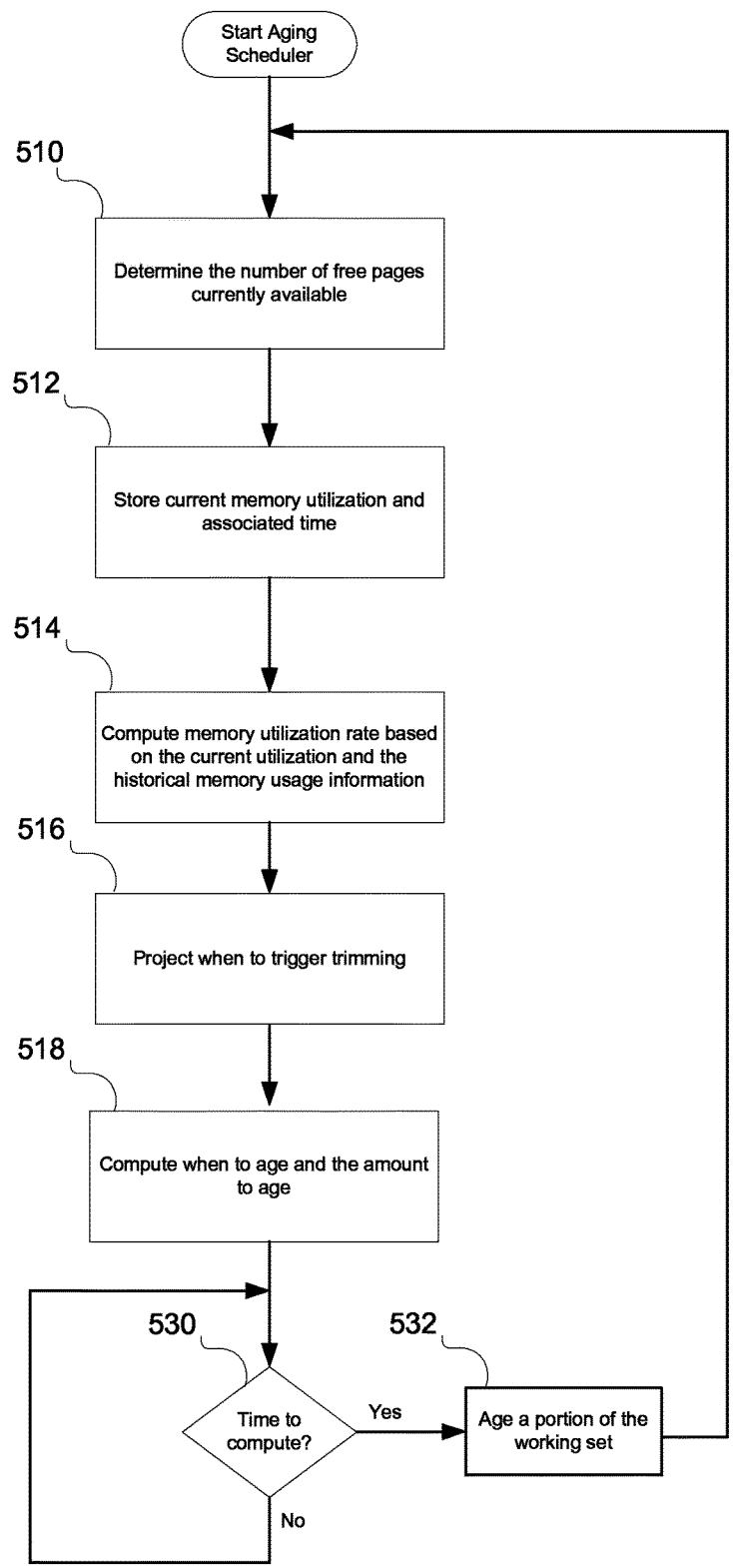
FIG. 5 is a flow chart of an exemplary process of an aging scheduler.

Regardless of what event triggers the scheduler to initially begin operation, FIG. 5 illustrates a flow chart of an exemplary process that may be performed by aging scheduler 226. Setting aging schedule 228 may begin at step 510 by determining the number of free pages currently available in the RAM. The calculated memory usage may be stored in history data store 224 at step 512. Proceeding to step 514, a memory utilization rate may then be computed based on the current memory utilization rate and the historical memory usage information stored in history data store 224. In some embodiments, a memory utilization rate may be computed by averaging the current memory utilization rate with the memory utilization values in the history data store 224. The average may be based on values recorded during some window of time or may be computed as a moving average. However, the computation could also be done in other suitable ways. The computed utilization rate information may then be used to project a time when trimming of working set 252 will trigger.

At step 518, aging schedule 228 may then be established and set by computing times for aging and/or the portion of the working set 252 to age at a corresponding time. The computed times and/or amount to age may be based on a selected number of aging passes. The number of aging passes may be selected in any suitable way. For example, the number of times to schedule each page to be aged before the projected trim time may be dictated by the maximum age count value that can be stored, such as page table 222. For example, the schedule may be set such that each page is aged no more than the maximum age count, and may be some fraction of it, such as half the maximum age count. In this way, pages that are inactive will have high age counts. Pages being accessed, are likely to have lower age counts, allowing discrimination between pages.

Regardless of how the number of times that each page is to be aged is determined, this value can be used to determine times and a portion to age at each time. It should be appreciated that multiple variables could be adjusted to arrive at an aging schedule that results in each page in the working set being aged a selected number of times before the projected trim time, including the rate of aging and the percentage of the working set aged at each aging pass. In some embodiments, the time between aging passes is a predetermined time. The percentage of pages aged at each pass could then be selected to result in each page in the working set being aged the selected number of times at the projected trim time. Though, it should be appreciated that values for different ones of the parameters that impact the aging schedule may be selected or computed in any suitable way.

Regardless of how these values are determined, after computing the time to age and the amount to age, a decision is made at step 530 as to whether or not it is time to compute a new aging count for any of the pages. If so, the flow proceeds to step 532 where a portion of the working set is aged in accordance with aging schedule 228. Aging schedule 228 details the times to age and the associated portion to age at the associated time. In this embodiment, the portion that is aged is in accordance with the portion designated by aging schedule 228.

The flow then returns back to step 510 where a new aging schedule may be computed. By periodically re-computing the aging schedule, the aging schedule is determined dynamically based on actual memory usage patterns. As a result, the likelihood that, when it is time to trim memory pages, the aging counts will have a distribution that is useful for reliably identifying the least active pages.

In the example illustrated, the aging schedule is recomputed at each aging pass. However, there is not a requirement that aging schedule and aging be performed at the same time. The aging schedule may be recomputed, for example, more or less frequently than aging is performed. Moreover, in some embodiments, re-computation the aging schedule may be performed in response to a detected event rather than at a scheduled time or rate. As a specific example, the aging schedule may be recomputed in response to a determination that the rate of memory consumption has changed and/or a determination that the free memory deviates from a projected amount of free memory.

Figure 6:
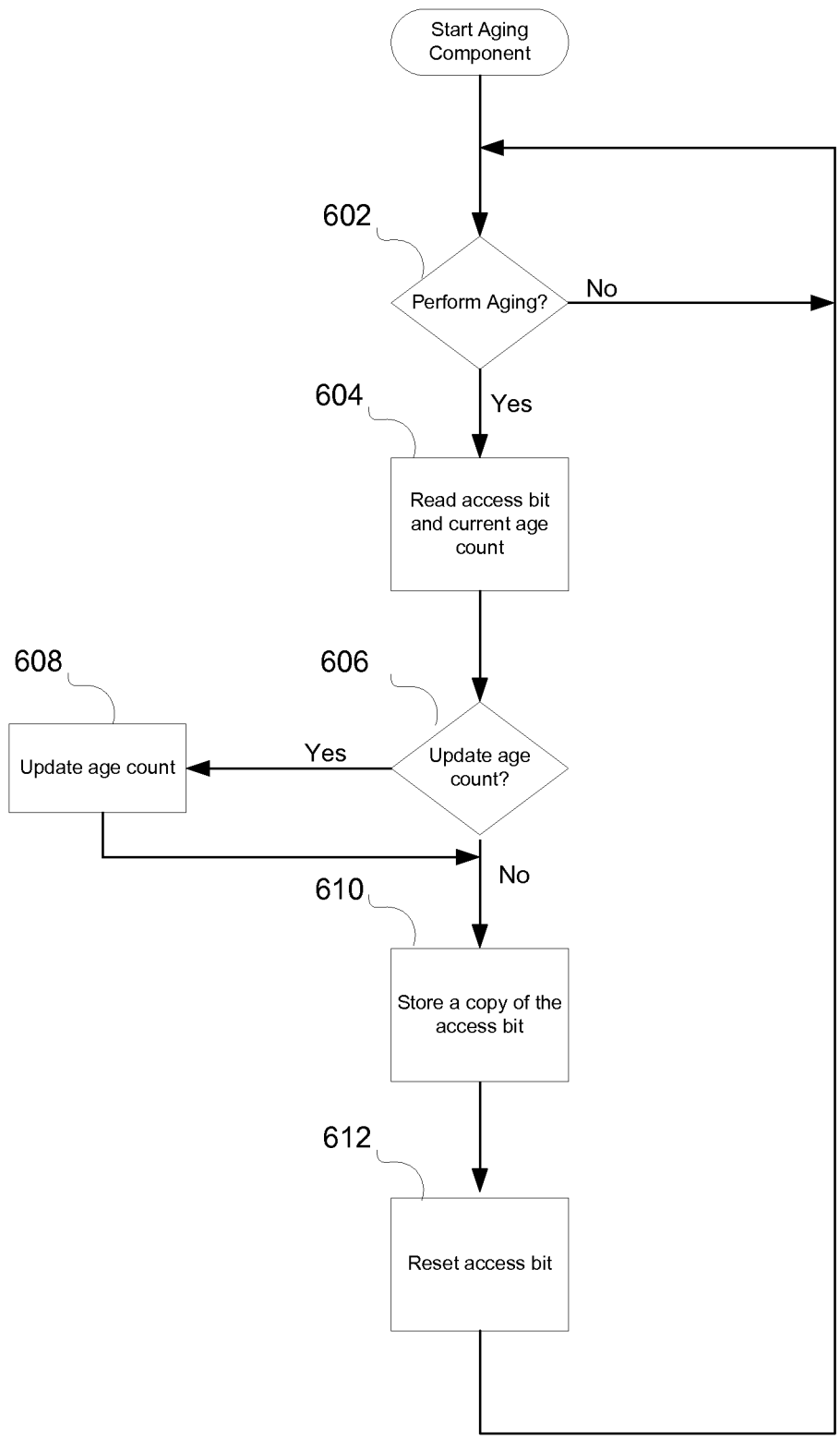
FIG. 6 is a simplified flow chart of an aging component.

Though, regardless of when and how determined, the established aging schedule 228 sets when aging is performed by aging component 230. FIG. 6 illustrates a simplified flow chart of a method of operation of aging component 230. Aging may start based on any number of conditions such as a time associated with an aging pass or an event which is detected (e.g., more memory needs to be allocated). At step 602, a decision is made as to whether or not to perform aging. Such check may be made by checking a current time and determining whether or not aging schedule 228 specifies that aging should be performed at or near the current time.

Aging schedule 228 may also indicate a portion of the working set 252 which is to be aged at a specified time. One of ordinary skill in the art will understand that if it is determined that aging was not performed at times previously specified by aging schedule 228, then aging component 230 may need to age portions of working set 252 as specified by aging schedule 228.

If, at step 602, it is decided that aging is to be performed, then aging component 230 may then read the access bit and age count for the pages which are to be aged. A decision may then be made at step 602 whether or not to proceed to step 608 and update the age count.

In some embodiments, a set access bit may reflect that a page has been accessed and the age count for the page may be reset at 608. On the other hand, an access bit which is not set may reflect that the page has not been accessed during an interval since access to the page was last checked. If so, then the age count may be increased at step 608.

Alternatively, at step 606, it may be decided that the age count should not be updated. In some embodiments, the age count may not be updated when the age count is at a maximum count and the access bit is not set. Regardless of the decision for whether or not to update the age count at 606, flow will proceed to step 610 and the current value of the access bit will be stored.

After step 610, flow proceeds to step 612. At step 612, the access bit for the page is reset so that page access can be determined on a subsequent check. After the access bit is reset at 612, the flow returns again to step 602 so that a decision can be made again as to whether or not to perform aging.

The age information updated by aging component 230 is used by trimming component 232 in order to discriminate among pages when trimming component 232 selects pages for trimming. FIG. 7 illustrates a simplified flow chart of a method of operation of trimming component 232 which selects pages to trim at step 706.

Figure 7:
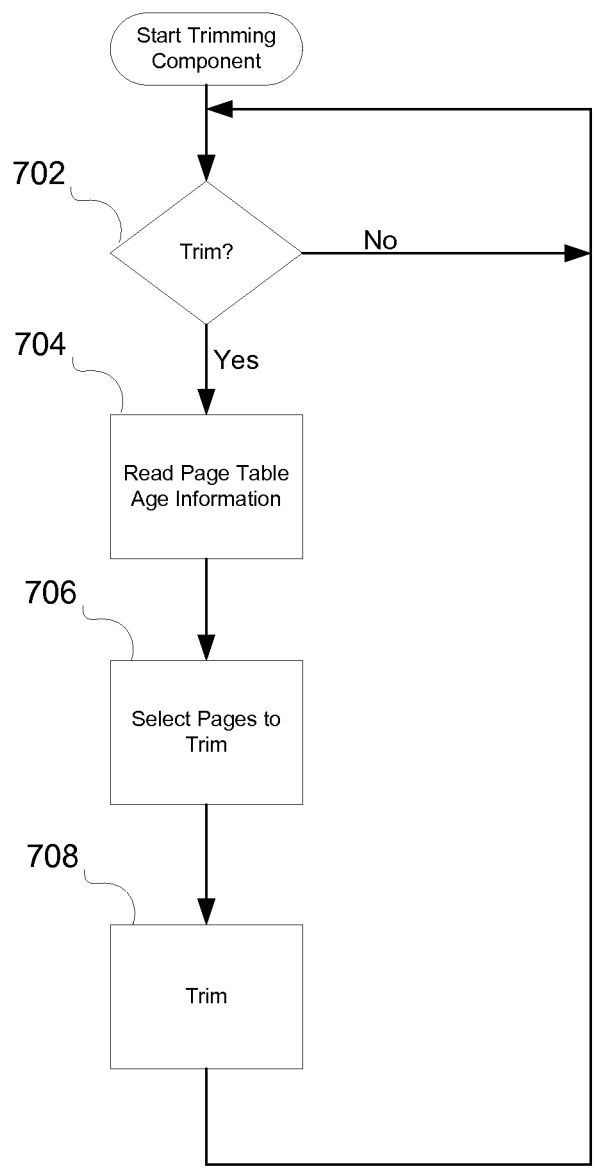
FIG. 7 is a simplified flow chart of a trimming component.

FIG. 7 shows trimming component 232 beginning with a decision to trim at step 702. The decision to trim may be based on when memory utilization approaches a critical threshold. Such a determination may be made using techniques as are known in the art. However, one of ordinary skill in the art may understand that the decision may be based on any other criteria, including the rate of utilization as described above. If it is decided at step 702 to perform trimming, then the page table 222 age information may then be read at step 704.

After reading the page table 222 age information, flow proceeds to step 706. At step 706, pages may be selected for trimming based on the page table 222 age information. The distribution of age counts may be used to discriminate among pages so as to select a set of pages for trimming. In some embodiments pages with a highest age count may be selected, but the selection may be done in other suitable ways.

Also, any suitable number of pages may be selected. In some embodiments, the selection may be made based on selecting a predetermined number of pages with a predetermined age count value. The predetermined number may represent the number of pages needed or some other suitable value. In some embodiments, all pages with an age count that falls within a predetermined range may be selected. In some embodiments the pages with an age which exceeds a predetermined threshold value may be selected. As a specific example, all of the pages with an age count at the highest value may be selected. Though, the number of pages selected may be based on a number of pages required to be allocated.

Though, the selection criteria may be such that the number of pages that are trimmed exceeds the number that will be immediately reallocated. Such selection criteria results in an increased time between trimming operations. In some embodiments, the selection criteria may be dynamic, the criteria may be different for each time the trimming component performs the selection at step 703. As may be understood by one of ordinary skill in the art, the distribution of age counts may be used in many other suitable ways to select the pages for trimming.

Flow can then proceed to step 708 at which point the selected pages can then be trimmed. The selected pages can be trimmed with low likelihood that performance of the computer system 100 will be impacted. Trimming may be performed using any suitable techniques, including techniques as are known in the art.

Having thus described several aspects of at least one embodiment of this invention, it is to be appreciated that various alterations, modifications, and improvements will readily occur to those skilled in the art.

For example, different or additional acts may be performed as part of the processes described above. As one example, the age counts may be reset from time to time in response to one or more events. For example, if the aging schedule is recomputed because the rate of memory consumption is slower than when the previous schedule was computed, age counts may be reset.

Moreover, stop conditions or other conditions may be incorporated into any of the processes described herein. For example, re-computation of the aging schedule may be suspended as memory utilization approaches a trimming threshold.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of aging memory, the method comprising:
dynamically computing an aging schedule for memory pages in a memory device based on a projected time at which a trimming of the memory pages in the memory device is predicted to begin, wherein the aging schedule defines a plurality of times at which a working set is to be aged before the projected time; and
aging the memory pages in the memory device in accordance with the aging schedule.

2. The method of claim 1, wherein:
dynamically computing the aging schedule comprises computing the aging schedule based on information regarding historical memory usage.

3. The method of claim 1, wherein:
dynamically computing the aging schedule comprises computing the aging schedule based on rate of memory usage.

4. The method of claim 1, wherein:
the projected time is based on a prediction regarding memory utilization for the memory device.

5. The method of claim 1, wherein:
the projected time represents a prediction of a time at which memory utilization for the memory device will exceed a trimming threshold.

6. The method of claim 1, wherein:
dynamically computing the aging schedule comprises computing quantities of memory pages to age at each of the plurality of times at which the working set is to be aged before the projected time.

7. The method of claim 6, wherein:
aging the memory pages in the memory device comprises, for a particular memory page:
determining whether the particular memory page was accessed since a preceding time at which the particular memory page was aged;
increasing a count associated with the particular memory page in response to a determination that the particular memory page was not accessed since the preceding time at which the particular memory page was aged; and
clearing the count associated with the particular memory page in response to a determination that the particular that memory page was accessed since the preceding time at which the particular memory page was aged.

8. The method of claim 1, wherein:
the aging schedule defines a portion of the working set to be aged at at least one of the defined plurality of times.

9. The method of claim 8, wherein:
the portion is defined based on number of times that the portion is to be aged before the projected time.

10. The method of claim 1, wherein:
a first set of pages from the working set is aged at a first of the plurality of times; and
a second set of pages from the working set is aged at a second of the plurality of times.

11. A computer system, comprising:
a first memory device that is configured to store a plurality of memory pages in a working set; and
a second memory device configured to store a pagefile, wherein the computer system is configured to:
compute a projected time at which trimming of the plurality of memory pages is predicted to occur;
define a plurality of times at which the plurality of memory pages are to be aged before the projected time; and
age the plurality of memory pages at at least two of the plurality of times at which the plurality of memory pages are to be aged before the projected time.

12. The computer system of claim 11, wherein the computing system is also configured to:
trim the plurality of memory pages according to the ages of the memory page.

13. The computer system of claim 11, wherein the computing system is configured to age the plurality of memory pages by:
increasing an age count of the memory page in response to a determination that the particular memory page was not accessed since before the first time; and
resetting the age count in response to a determination that the particular memory page was accessed after the first time.

14. The computer system of claim 11, wherein the computing system is configured to age the plurality of memory pages by:
aging a first set of pages from the working set at a first of the plurality of times; and aging a second set of pages from the working set at a second of the plurality of times.

15. The computer system of claim 11, wherein:
the projected time represents a prediction of a time at which memory utilization for the first memory device will exceed a trimming threshold.

16. The computer system of claim 11, wherein the computing system is configured to age the plurality of memory pages by:
computing quantities of memory pages to age at each of the plurality of times at which the working set is to be aged before the projected time.

17. A computer system, comprising:
a first memory device that stores data in a plurality of memory pages;
a second memory device that stores a pagefile, wherein the computer system is configured to:
age the plurality of memory pages at at least two times between successive trimmings of the plurality of memory pages; and
trim the plurality of memory pages according to the ages of the memory page.

18. The computer system of claim 17, wherein the computing system is also configured to:
compute a projected time at which trimming of the plurality of memory pages is predicted to occur.

19. The computer system of claim 17, wherein the computing system is configured to age the plurality of memory pages by:
increasing an age count of a memory page in response to a determination that the memory page was not accessed since before a first time; and
resetting the age count in response to a determination that the memory page was accessed after the first time.

20. The computer system of claim 17, wherein the computing system is configured to age the plurality of memory pages by:
aging a first set of pages from the plurality of memory pages at a first of the at least two times; and
aging a second set of pages from the plurality of memory pages at a second of the at least two times.

* * * * *